May 3, 1966 W. W. MARTIN 3,249,102
HUMIDIFIER

Filed July 10, 1964 3 Sheets-Sheet 1

INVENTOR.
WARNER W. MARTIN
BY
Marechal, Biebel, French & Bugg
ATTORNEYS

May 3, 1966 W. W. MARTIN 3,249,102
HUMIDIFIER
Filed July 10, 1964 3 Sheets-Sheet 2

INVENTOR.
WARNER W. MARTIN
BY
Marechal, Biebel, French & Bugg
ATTORNEYS

May 3, 1966 W. W. MARTIN 3,249,102
HUMIDIFIER
Filed July 10, 1964 3 Sheets-Sheet 3
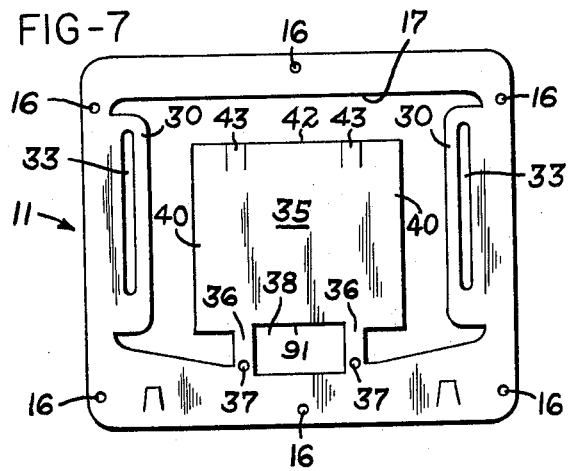
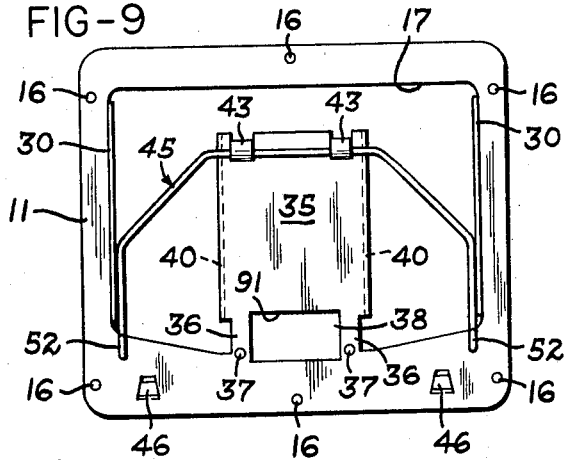
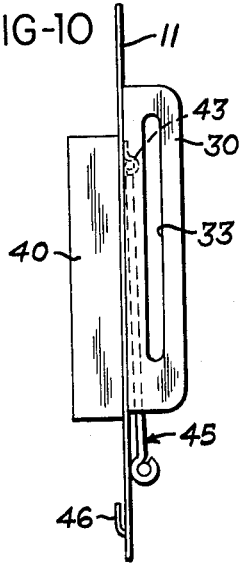
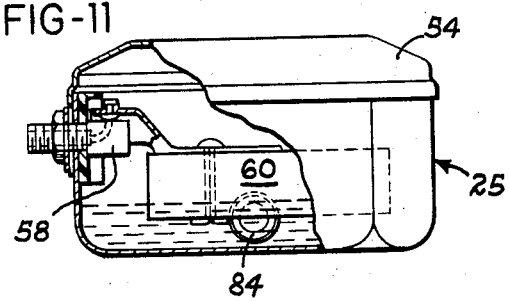
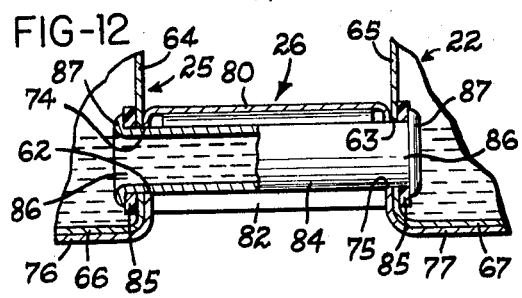
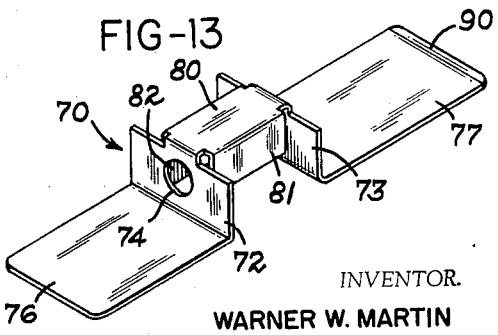
INVENTOR.
WARNER W. MARTIN
BY
Marechal, Biebel, French & Bugg
ATTORNEYS United States Patent Office 3,249,102
Patented May 3, 1966

3,249,102
HUMIDIFIER
Warner W. Martin, Olmstead Falls, Ohio, assignor to The Lau Blower Company, Dayton, Ohio, a corporation of Ohio
Filed July 10, 1964, Ser. No. 381,756
8 Claims. (Cl. 126—113)

This invention relates to humidifiers, and particularly to a plate type humidifier unit adapted for mounting on a domestic hot air furnace.

A plate type humidifier utilizes a plurality of absorbent plates, of asbestos, ceramic or other suitable material, which have the lower portions thereof submersed below the surface of the water in a reservoir pan. Through the process of capillary action, the absorbent plates become saturated with water so that moisture is evaporated therefrom when heated air from the furnace passes over the surfaces of the plates.

Perhaps the most serious disadvantage of these plate type humidifiers is that the plates quickly become filled with solids which precipitate as the water is evaporated so that they must be replaced frequently with new plates to maintain a satisfactory evaporation rate. This replacement is usually a wet and dirty job and often requires removal of the entire humidifier unit from the the furnace, which many home owners are reluctant to do because of the apparent complexity thereof. As a result the plates are not replaced, and the humidifier ceases to operate properly.

In addition, many of these humidifiers are expensive and include numerous parts which are difficult to manufacture and assemble. For example, they often include complicated water control valves which are subject to failure. Many units are susceptible to water leakage, and others can be mounted only on a vertical wall of a furnace. Moreover, these prior art units are often quite difficult to install, thus requiring a comparatively large amount of time of a skilled workman.

Accordingly, an important object of this invention is to provide an improved evaporator plate type humidifier constructed for quick and easy removal and replacement of the evaporator plates.

Another object of the invention is to provide a humidifier unit of the aforesaid type wherein the mounting plate can be secured to a vertical or sloped wall of the furnace without requiring any major changes to the unit, and particularly to provide a humidifier unit which is inexpensive and dependable in operation and capable of installation in a minimum amount of time.

A further object of the invention is to provide a humidifier having a removable unitary reservoir unit which includes the evaporator plates, the reservoir pan, and the water level control device and which is simply manufactured for decreased cost while being liquid tight so that water will not leak therefrom, and further to provide such a reservoir unit which can be removed manually from the humidifier so that the evaporator plates can be changed and the reservoir pan cleaned at a point remote from the furnace.

Further objects and advantages of the invention will be apparent from the following description, the accompanying drawings and the appended claims.

In the drawings—

FIG. 7 is an elevation view of the mounting plate before being shaped for shipment;

FIG. 8 is an end view of the plate shown in FIG. 7;

FIG. 9 is a view similar to FIG. 7 showing the face plate ready for shipment;

FIG. 10 is an end view of the mounting plate shown in FIG. 9;

FIG. 11 is an elevation view partially in section of the float container;

FIG. 12 is an enlarged sectional view through the bracket which interconnects the float container and the reservoir pan and taken on the line 12—12 of FIG. 3; and FIG. 13 is a perspective view of this bracket.

Figure 1:
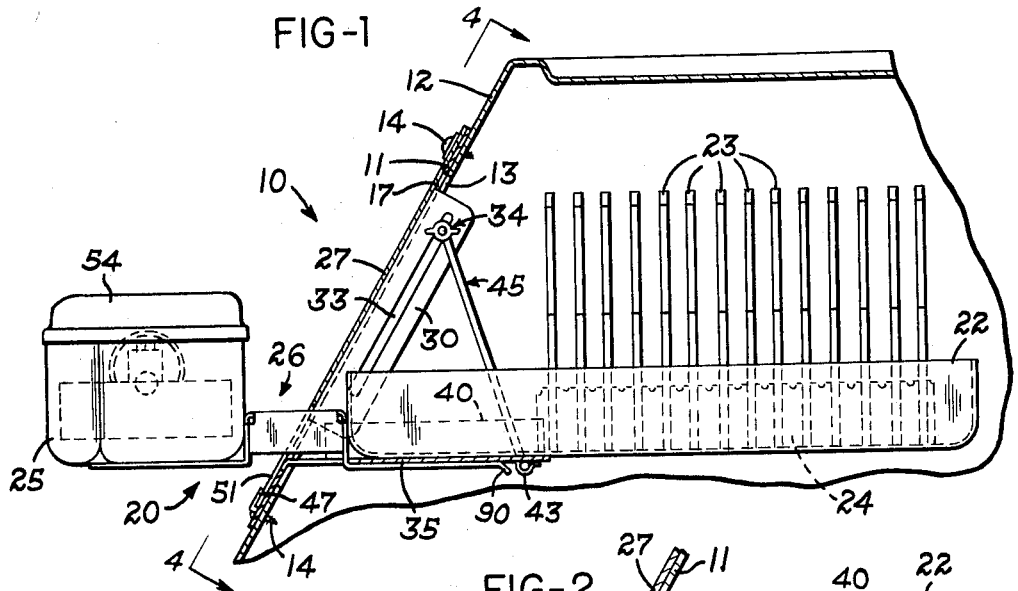
FIG. 1 is a side elevation view showing the humidifier unit mounted in a furnace.
Figure 3:
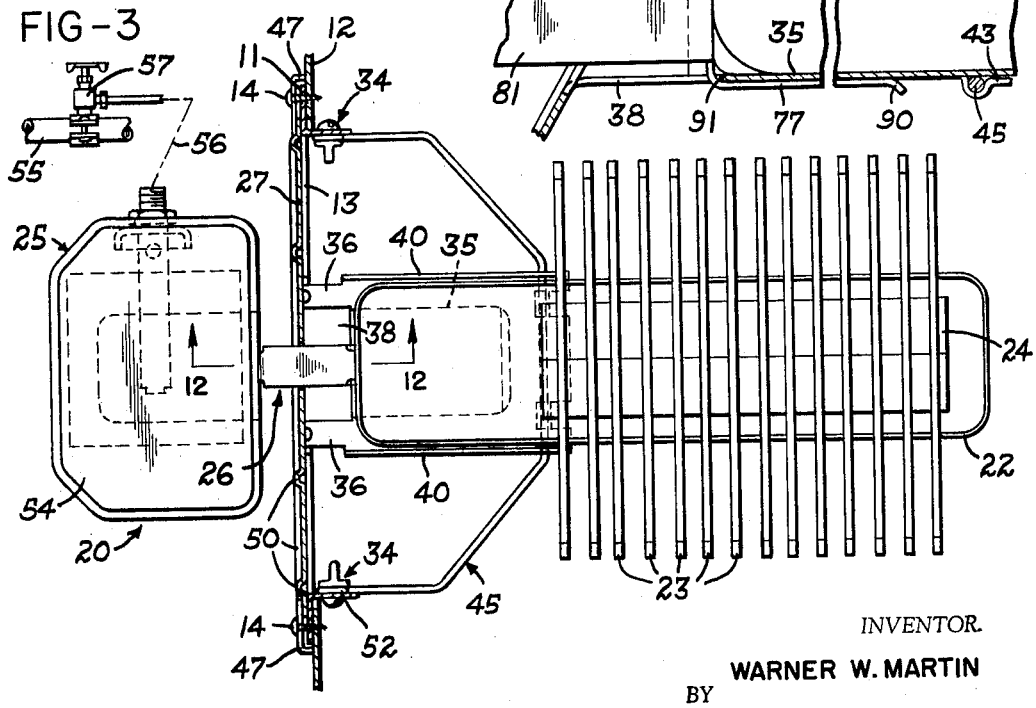
FIG. 3 is a plan view of the humidifier unit shown in FIG. 1.

Referring to the drawings wherein a preferred embodiment of the invention is shown, FIGS. 1 and 3 illustrate a humidifier unit 10 which includes a mounting plate 11 secured to a vertical or sloped wall 12 of a hot air furnace or the like. The mounting plate 11 is secured over an aperture 13 in the sloped wall by the screws 14 which extend through the openings 16 in the plate and into the furnace wall. The mounting plate 11 has an interior opening 17 therein which is aligned with the aperture 13 in the furnace wall.

The reservoir unit 20 is held securely in position in the furnace by the mounting plate in such a manner that the unit 20 can be easily inserted and removed from the furnace without removal of the mounting plate 11. This reservoir unit includes a reservoir pan 22 having a plurality of T-shaped evaporator plates 23 positioned upright therein by the bracket 24 and a float container 25 mounted exteriorly of the wall 12. The reservoir pan 22 and the float container 25 are rigidly interconnected by the bracket 26, and the opening 17 within the mounting plate 11 can be closed by a cover 27 when the humidifier 10 is in its assembled position.

The mounting plate 11 is shown in FIGS. 7–8 as it is stamped from a piece of sheet metal, and it includes a generally rectangular outer configuration with the side flanges 30 formed integrally within the interior thereof along the sides of the opening 17. These flanges are subsequently deformed inwardly of the furnace and perpendicularly to the adjacent portions of the mounting plate 11, as seen in FIGS. 1 and 10. Each of the flanges 30 has an elongated slot 33 therein of predetermined width for receiving the adjustable bolt and wing nut combination 34, as shown in FIG. 3.

Also formed integrally with the mounting plate is a support tray 35 which can be bent inwardly of the furnace along the line formed by the connection of the narrow strips 36 to the lower portion of the plate 11. The small openings 37 are provided in the strips 36 to reduce the force required to bend the support tray 35 with respect to the plate 11. The rectangular opening 38 is formed between the strips 36 so that the support tray can be easily bent to its desired position, as well as to aid in holding the reservoir assembly in place, as will be explained. The support tray 35 also has side flanges 40 along each side thereof substantially coextensive therewith and bendable at right angles upwardly therefrom to define side walls for limiting relative movement between the reservoir pan 22 and the mounting plate 11, as shown in FIG. 3.

The inner edge 42 of the tray 35 has the strips 43 cut therein and swaged around the support wire 45 which interconnects the side flanges 30 and the support tray 35, as shown in FIGS. 1 and 3. When the strips 43 are deformed around the wire 45, the latter can be pivoted but not separated from the plate 11. Thus FIGS. 9 and 10 illustrate the mounting plate 11 as it is shipped from the factory with the tray 35 still lying in the original plane of the plate 11 so that only a minimum of space is required in the shipping container. The support wire 45 is secured in place although the ends thereof are hanging free, and the side flanges 30 and 40 are in their operative positions.

Figure 5:
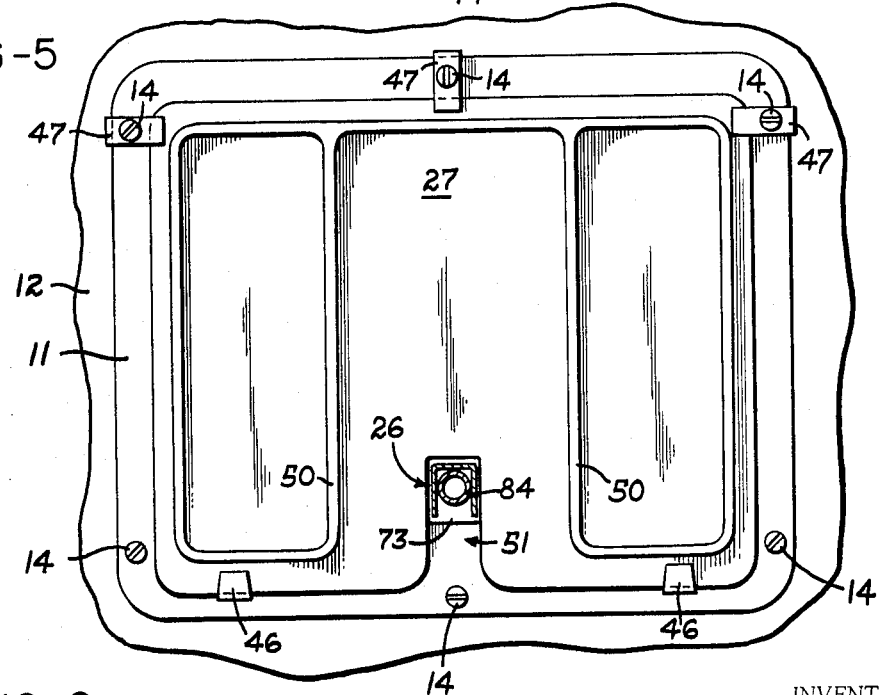
FIG. 5 is a sectional view similar to FIG. 4 with the cover in place.
Figure 6:
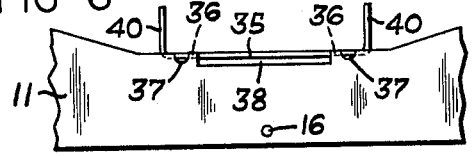
FIG. 6 is an enlarged elevation view of the support tray.

As shown in FIG. 5, the hook portions 46 are punched from the lower periphery of the plate 11 for receiving the lower edge of the cover 27, and the clamps 47 are provided on the sides of the plate 11 near the top of the cover 27 for holding the upper portion of the cover in place. Loosening the clamps 47 allows the cover plate 27 to be slipped upwardly and removed from the mounting plate. The cover 27 has the indentations or beads 50 formed therein for adding strength thereto, and the slot 51 is formed in the lower central portion thereof so that the cover 27 will fit around the bracket 25.

As indicated, the support tray 35 is supported in its extended position by the U-shaped support wire 45 which has eyelets 52 in each end thereof so that the screw-nut combinations 34 can be inserted therethrough and through the slots 33 to secure the wire adjustably to the flanges 30. The elongated slots 33 permit the support tray to be adjusted to a horizontal position regardless of the slope of the furnace wall 12, by merely loosening the wing nuts and appropriately adjusting the connection between the upper ends of the wire and the flanges 30 until the support tray 35 is in a horizontal plane.

The float container 25 is a small sheet metal pan having a cover 54 removably secured thereon, and as shown in FIG. 3, the float container is connected to a household water line 55 through the inlet pipe 56 and the small manual valve 57 clamped to the water line. The inlet pipe 56 is connected within the container 25 to a valve 58 which is opened and closed by vertical movement of the float 60 in response to a change in water level to maintain a preset level of water within the container 25.

The reservoir pan 22 and float container 25 both have small apertures 62 and 63 formed in adjacent side walls 64 and 65 thereof at equal distances above the respective bottom walls 66 and 67 thereof, as seen in FIG. 12. The bracket 26 secures the pan 22 and container 25 together and includes the sheet metal spacer 70 interposed between and in contact with the side walls 64 and in alignment with the apertures 62 and 63. The spacer 70 has the vertical walls 72 and 73 which thus engage the side walls 64 and 65, respectively, with the apertures 74 and 75 in each of these walls being aligned with the apertures 62 and 63 in the side walls 64 and 65. The bottom plates 76 and 77 of the spacer 70 similarly conform to and engage the bottom walls 66 and 67 of the pan and container, respectively, whereas the horizontal and vertical walls 80, 81, and 82 of the spacer 70 separate the pan and container by a preset distance.

The assembly is locked together by inserting the short pipe 84 through the aligned apertures 62, 63, 74 and 75, and then placing a resilient annular seal 85 over each of the ends 86 of the pipe 84 and deforming the ends radially outward and toward the adjacent side wall 64 or 65. The ends are actually deformed at 87 into the seals 85 so that the finished assembly is rigid and there is a water tight connection between the pipe 84 and the adjacent side walls 64 and 65 so that water leakage through the apertures 62 and 63 is prevented. The bracket 26 thus forms a rigid connection for the reservoir pan 22 and the float chamber 25, as well as a water tight connection therebetween so that water will flow from the container 25 into the pan 22.

To mount the humidifier unit 10 on a wall 12, it is merely necessary to cut an aperture 13 in the furnace wall or bonnet regardless of whether or not this wall is vertical or sloped. The mounting plate 11 is then secured in position by inserting the screws 14 in the openings 16 around the periphery of this plate to lock it securely to the furnace wall. Prior to securing the plate in place, the support tray 35 is deformed so it will extend generally in a horizontal plane into the opening, and the support wire 45 is secured to each of the side flanges 30 by the screw and wing nut combinations 34. After the plate 11 is secured to the furnace wall, a level is placed on the support tray 35 and it is moved to a horizontal plane by adjusting the point of connection between the wire 45 and the side flanges 30. Access is easily gained to these wing nuts through the relatively large opening 17 in the mounting plate 11, as shown in FIG. 4.

Figure 2:
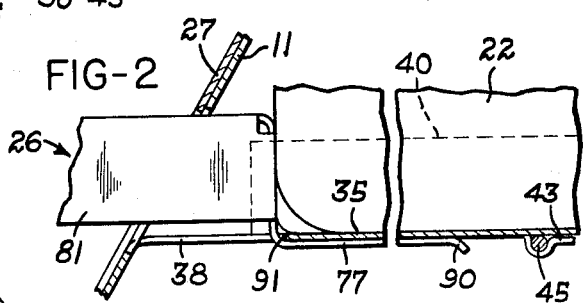
FIG. 2 is an enlarged fragmentary sectional view showing the structure of the reservoir assembly secured to the mounting plate.

The evaporator plates 23 are then placed in the reservoir pan 22 of the reservoir unit 20 in an upright position, as shown in FIGS. 1 and 3, so that the lower portions thereof extend into the pan. The entire unit 20 is secured in place by insertion through the opening 17 so that the downwardly deformed lip 90 on leading edge of the bracket 26 engages the edge 91 of rectangular opening 38. The unit 20 is then forced horizontally into the furnace so that the tray 35 is disposed between the bottom wall 77 of the bracket 26 and the bottom wall 67 of the reservoir pan 22, as shown in FIG. 2. The unit 20 is properly clamped on the tray 35 when the edge 91 of the tray 35 contacts the wall 73 of the bracket 26. Pivotal movement of the unit 20 in a horizontal plane is limited by the side flange 40 on the tray 35.

Figure 4:
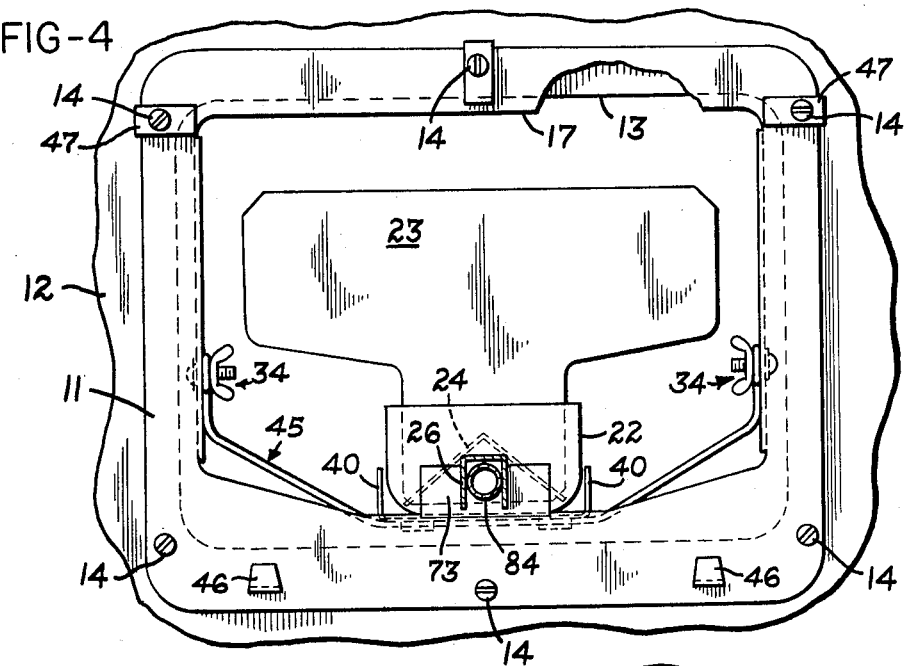
FIG. 4 is a sectional view taken along the line 4—4 of FIG. 1 with the cover removed from the unit.

As shown in FIG. 4, the evaporator plates 23 easily pass through the mounting plate 11 by reason of the large opening 17 so that there is no difficulty in inserting or removing the unit 20. The cover 27 is then placed on the mounting plate 11 by sliding it beneath the clamps 47 with the slot 51 in the lower edge thereof fitting around the bracket 26 of the reservoir assembly 20. The water line 56 is then connected to the float container 25 in the usual manner, and the water flows from the pipe 55 into the float container 25 so long as the level of water therein is below a predetermined level governed by the float 60. As the water level raises in the container 25, it flows through the pipe 84 into the reservoir pan 22, creating a corresponding water level within the pan 22. When the predetermined level is reached, the float 60 closes the valve 58 and terminates additional flow into the float container 25.

The lower portions of the evaporator plates 23 are submerged when the water is at or near the predetermined level, and water is absorbed thereby through the process of capillary action until the entire plate is saturated. The heated air from the furnace passes around and over the plates 23, causing evaporation of the moisture on or near the surfaces thereof to effect an increase in the moisture content of the air. As moisture is evaporated from the plates, more water is absorbed thereby so that the plates remain saturated at all times, and as the water level in the pan 22 and container 25 decreases, the float 60 opens the valve 58 slightly to restore the predetermined level. This operation continues indefinitely provided the humidifier unit 10 is clean and the evaporator plates 23 are replaced at appropriate intervals. The degree to which the invention adds moisture to the air can be varied by changing the number of evaporator plates, thus proportionally varying the surface area over which the heated air will flow.

When it is desired to replace the evaporator plates 23, it is merely necessary to loosen the clamps 47 and remove the cover 27 from the mounting plate 11 and to disconnect the water line 55 from the float container 25. The reservoir assembly 20 is then easily removed horizontally from the mounting plate and the furnace to a convenient place where the old plates can be removed and new plates inserted. Since the unit 20 is easily withdrawn, the chances of spilling water therein are remote, thus adding to the desirability of the unit. At the same time as the plates are replaced, any residue which has collected in the float container 25 or reservoir pan 22 can be removed with a wire brush or any other suitable tool. The reservoir unit 20 is then replaced in the furnace by reversing the procedure described above so that only a few seconds are involved to disassemble the humidifier unit.

Thus the invention has provided an improved humidifier unit which can be easily and quickly installed on a hot air furnace regardless of whether the wall thereof is vertical or sloped. The unit is inexpensive and simple in construction so that it is dependable in operation and does not require more than a very minimum of materials to manufacture the same. Moreover, once the unit is placed in service it can be cleaned and the plates can be replaced by the average unskilled home owner without requiring much time or necessitating that the home owner become inconvenienced.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A humidifier adapted to be mounted on a wall of a hot air furnace, comprising a mounting plate adapted to be secured to the side wall of a furnace, means defining an opening in said plate, a support tray secured to and extending inwardly from said mounting plate at the lower peripheral edge of said opening, a reservoir unit adapted to be secured releasably on said support, said unit including an elongated reservoir pan and adapted to have a plurality of evaporator plates mounted therein and extending therefrom, said unit also including a float container adapted for connection to a source of water, means for regulating the level of water in said float container, a spacer interposed between said pan and chamber and including side walls disposed in contact with side walls of said pan and container, axially aligned apertures in each of said side walls, a tubular member extending through each of said apertures for cooperation with said spacer to secure the said pan and container together and provide a liquid connection therebetween, a horizontal bottom extension on said side wall of said spacer adjacent said side wall of said reservoir pan, said extension being biased toward contact with the bottom of said reservoir pan, and said reservoir unit being receivable on said tray with said free edge and said tray being interposed between said bottom of said pan and said bottom extension to clamp said unit on said tray.

2. A humidifier adapted to be mounted on a vertical or sloped wall of a hot air furnace, comprising a mounting plate adapted to be secured to the side wall of a furnace around the periphery of an aperture therein, means defining an opening of predetermined size and configuration in said mounting plate, a support tray integrally connected to said mounting plate at the lower peripheral edge of said opening and formed from the material of said mounting plate, said support tray being movable with respect to said mounting plate, a wire bracket means pivotally secured to the end of said tray opposite said mounting plate, means for adjustably securing the ends of said bracket to said plate so that said support tray may be positioned in a horizontal plane when said mounting plate is mounted on a vertical or sloped wall, a reservoir unit releasably secured to said support tray and including a pan adapted to have a plurality of evaporator plates associated therewith, means for maintaining a preset level of water in said pan, said opening in said mounting plate being larger in size and configuration than said reservoir unit with said evaporator plates therein for removal of said unit and replacement of said plates without separating said mounting plate from the furnace, and a removable cover adapted to be secured to said mounting plate to close said opening.

3. A humidifier adapted to be mounted on a vertical or sloped wall of a hot air furnace, comprising a mounting plate adapted to be secured to the side wall of a furnace around the periphery of an aperture therein, means defining an opening of predetermined size and configuration in said plate, a support tray attached to and extending inwardly from said mounting plate at the lower peripheral edge of said opening, said support tray being movable with respect to said mounting plate, means for adjustably securing one end of said support tray to said plate so that said support may be positioned in a horizontal plane when said mounting plate is mounted on a vertical or sloped wall, a reservoir unit resting on said support and including a pan having a plurality of evaporator plates associated therewith, clamp means for releasably securing said reservoir unit to said support tray and limiting movement thereof to insertion or removal of said reservoir unit through said opening, means for maintaining a preset level of water in said pan, said opening in said mounting plate being larger in size and configuration than said reservoir unit with said evaporator plates therein for removal of said unit and replacement of said plates without separating said mounting plate from the furnace, and a removable cover adapted to be secured to said mounting plate to close said opening.

4. A humidifier adapted to be mounted on a vertical or sloped wall of a hot air furnace, comprising a mounting plate adapted to be secured to the side wall of a furnace around the periphery of an aperture therein, means defining an opening of predetermined size and configuration in said plate, inwardly extending side flanges formed integrally in said plate on opposite sides of said opening and extending perpendicularly from said opening, elongated slots in each of said side flanges, a support tray integrally secured to and extending inwardly from said mounting plate at the lower peripheral edge of said opening between said side flanges, said support tray being bendable from the plane of said mounting plate in the same direction as said side flanges, support wire means for adjustably securing the end of said support tray opposite said plate to said side flanges, fastener means cooperating with said slots for adjustably securing said wire means to said side flanges so that said support tray may be positioned and held in a horizontal plane when said mounting plate is mounted on a vertical or sloped wall, a reservoir unit resting on said support tray and including a pan having a plurality of evaporator plates associated therewith, means for maintaining a preset level of water in said pan, said opening in said mounting plate being somewhat larger in size and configuration than said reservoir unit with said evaporator plate therein for removal of said reservoir unit through said opening and replacement of said plates without separating said mounting plate from the furnace, and a removable cover adapted to be secured to said mounting plate to close said opening.

5. A humidifier adapted to be mounted on a wall of a hot air furnace, comprising a mounting plate adapted to be secured to the side wall of a furnace around the periphery of an opening therein, a support secured to and extending inwardly from said mounting plate at the lower peripheral edge of said opening, a reservoir assembly resting on said support, said assembly including an elongated reservoir pan having a plurality of evaporator plates mounted therein and extending therefrom, a float container adapted for connection to a source of water, means defining apertures in adjacent sides of said pan and container, a spacer interposed between said pan and chamber and surrounding at least a portion of each of said apertures, a tubular member extending through each of said apertures and having the ends thereof enlarged outwardly adjacent the inner surfaces of said pan and container around said apertures to lock the same together and provide a liquid connection therebetween, means for regulating the water in said float container to a level extending above a portion of said tubular member so that the level of water in each are equal, said opening in said mounting plate being larger than said plates and having a size and configuration so that said reservoir unit with said evaporator plates therein can be removed therethrough for removal and replacement of said plates without separating said mounting plate from the furnace, and a removable cover adapted to be secured to said mounting plate to close said opening.

6. A humidifier adapted to be mounted on a wall of a hot air furnace, comprising a mounting plate adapted to be secured to the side wall of a furnace, means defining an opening in said plate, a thin support tray secured to and extending inwardly from said mounting plate at the lower peripheral edge of said opening adapted to extend horizontally into the furnace, means defining an aperture in the area of connection between said support tray and said mounting plate to form a free exposed edge on the portion of said tray adjacent said mounting plate, a reservoir unit adapted to be secured releasably on said support, said unit including an elongated reservoir pan having a plurality of evaporator plates mounted therein and extending therefrom, a float container adapted for connection to a source of water, means for regulating the lever of water in said float container, spacer means for connecting said pan and chamber together, a horizontal bottom extension on said spacer means adjacent the bottom of said reservoir pan, said reservoir unit being receivable on said tray with said free edge and said tray interposed between the bottom surface of said pan and said bottom extension to clamp said reservoir unit on said tray, and said opening in said mounting plate being larger than said plate and having a size and configuration so that said unit with said evaporator plate therein can be removed therethrough for removal and replacement of said plates without separating said mounting plate from the furnace.

7. A humidifier adapted to be mounted on a wall of a hot air furnace, comprising a mounting plate adapted to be secured to the side wall of a furnace, means defining an opening in said plate, a thin support tray secured to said mounting plate at the lower peripheral edge of the surface of said opening adapted to extend horizontally into the furnace, means defining an aperture in the area of connection between said tray and said mounting plate to form a free exposed edge on the portion of said tray adjacent said mounting plate, a reservoir unit adapted to be secured releasably on said support, said unit including an elongated reservoir pan adapted to receive and hold upright a plurality of evaporator plates, a float container adapted for connection to a source of water, means for regulating the level of water in said float container, a spacer for connecting said pan and chamber together, a horizontal bottom extension on said spacer biased toward contact with the bottom of said reservoir pan, and said reservoir unit being receivable on said tray with said free edge and said tray being interposed between the bottom surface of said pan and said bottom extension to clamp said reservoir unit on said tray.

8. A humidifier adapted to be mounted on a wall of a hot air furnace, comprising a mounting plate adapted to be secured to the side wall of a furnace, means defining an opening in said plate, a thin support tray secured to said mounting plate at the lower peripheral edge of the surface of said opening adapted to extend horizontally into the furnace, means defining an aperture in the area of connection between said support tray and said mounting plate to form a free exposed edge on the portion of said tray adjacent said mounting plate, a reservoir unit adapted to be inserted and removed from said mounting plate as a unit, said unit including an elongated reservoir pan and adapted to have a plurality of evaporator plates mounted therein and extending therefrom, a float container adapted for connection to a source of water, means for regulating the level of water in said float container, a spacer interposed between said pan and chamber and including side walls disposed in contact with side walls of said pan and container, axially aligned apertures in each of said side walls, a tubular member extending through each of said apertures and having the ends thereof deformed radially outward to lock the said pan and container together and provide a liquid connection therebetween, a horizontal bottom extension on said side wall of said spacer adjacent said side wall of said reservoir pan, said extension being biased toward contact with the bottom of said reservoir pan, and said reservoir unit being receivable on said tray with said free edge and said tray interposed between said bottom of said pan and said bottom extension to clamp said unit on said tray.

References Cited by the Examiner

UNITED STATES PATENTS

| | | | |
|---|---|---|---|
| 2,565,210 | 8/1951 | Dovolis | 126—113 |
| 2,585,764 | 2/1952 | Getz | 126—113 |
| 2,831,477 | 4/1958 | Perlman | 126—113 |

JAMES W. WESTHAVER, *Primary Examiner.*